J. STEPHENSON.

STREET-CAR.

No. 6,986. Reissued March 7, 1876.

Witnesses:

D. G. Stuart

James H. McGill

Inventor.

John Stephenson by S. Hannay

Atty.

N. PETERS, PHOTO-LITHOGRAPHER, WASHINGTON, D. C.

UNITED STATES PATENT OFFICE

JOHN STEPHENSON, OF NEW YORK, N. Y.

IMPROVEMENT IN STREET-CARS.

Specification forming part of Letters Patent No. 61,482, dated January 22, 1867; reissue No. 6,696, dated October 11, 1875; reissue No. 6,986, dated March 7, 1876; application filed December 17, 1875.

DIVISION E[4].

*To all whom it may concern:*

Be it known that I, JOHN STEPHENSON, of New York, in the county of New York and State of New York, have invented certain new and useful Improvements in Street-Cars; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
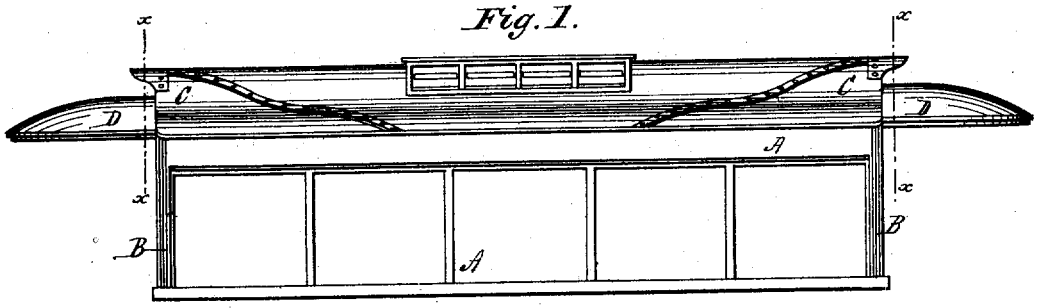
Figure 2:
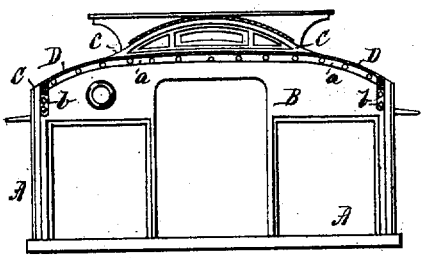
Figure 4:
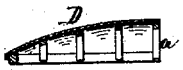
Figure 3:
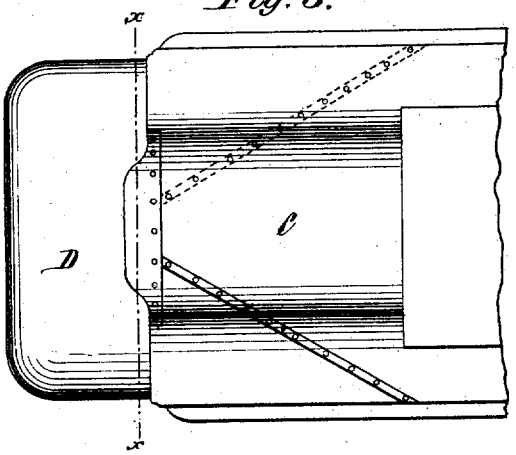

Figure 1 represents a side elevation of the upper portion of a street-car to which my improvement has been applied; and Fig. 2 a vertical cross-section of the same, as taken through the line *x x* of Fig. 1, looking toward the car-body. Fig. 3 represents a plan or top view of the car-body, a portion being broken off. Fig. 4 represents a vertical section of the independent canopy, taken centrally through the same in the line of the length of the car-body; and Fig. 5 a plan of the same, as detached from the car.

This division of my invention relates to the construction of the canopies which cover or protect the platforms of street-cars from the sun or inclemency of the weather.

As heretofore constructed, those portions of car-roofs which project over the platforms are most subject to breakage; and, hence, the top rails, which continue beyond the corner pillars, are most apt to be broken at their juncture with the latter, and are, consequently, difficult of repair. For this and other reasons, such as economy of transportation, I limit the length of the car-roof to the length of the car-body, and make the canopies which protect the platforms independent and separate structures, capable of being readily secured to or detached from the car-body.

To enable others skilled in the art to make, construct, and use my invention, I will now proceed to describe its parts in detail, omitting a particular description of such parts of a street-car as is unnecessary to a full understanding of the present improvement.

A indicates the body of the car; B B, its ends, and C the roof, which is limited in length to the length of the car-body, as may be seen in Figs. 1 and 3. B indicates the canopy or end roof, which protects the driver's or conductor's platform from the sun or inclemency of the weather.

This canopy is made separately from the car, so as to form an independent structure, and may have its rails *a* made of bent wood, running crosswise of the car, thereby enabling it to be made much lighter than if formed by the continuation of the timber of the roof, as heretofore.

Figure 5:
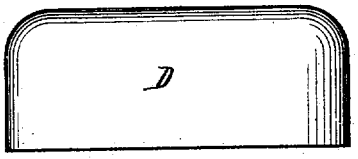

Its construction is illustrated in Figs. 4 and 5.

Thus constructed, it is secured to the end of the car by means of screws or screw-bolts and nuts, which, for this purpose, may be passed through the innermost rail *a* of the canopy into or through the end of the car.

As a further support, two metal brackets, *b*, are bolted to the end of the car and to the canopy, there being one on each side of the end of the car at the junction of the latter with the canopy. By this construction and mode of applying the canopy to the end of the car, it will be apparent that the former can be readily applied to or detached from the latter for any required purpose.

Having described my invention, what I claim as new, and desire to secure by Letters Patent, is—

1. A detachable canopy for the protection of the driver's or conductor's platform, substantially as and for the purposes described.

2. The combination of an independent canopy with a street-car, in such manner that the former may be attached to, or detached from, the latter, substantially as set forth.

In testimony that I claim the foregoing I have hereunto set my hand this 3d day of December, 1875.

JOHN STEPHENSON.

Witnesses:
S. A. STEPHENSON,
AUGUST RIPPERGER.